Figure 1:
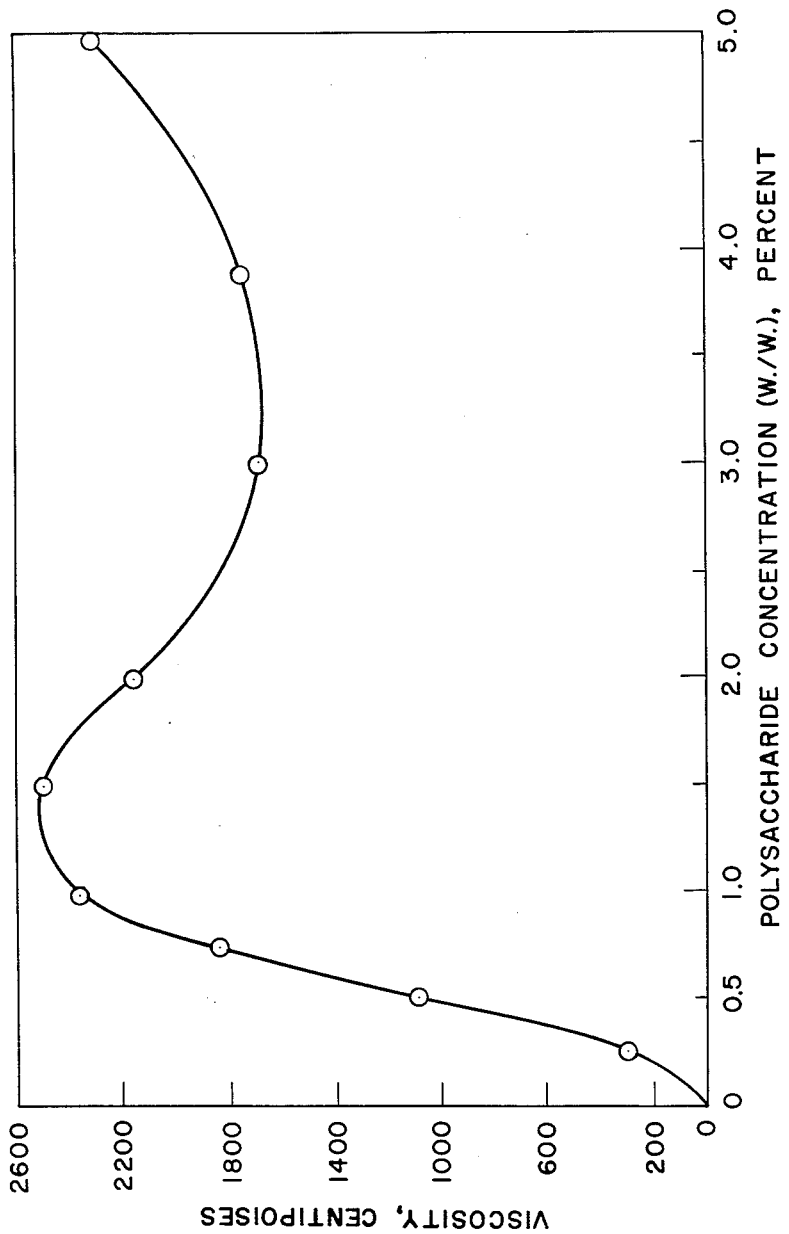

INVENTORS
ROBERT G. BENEDICT
ALLENE R. JEANES
LYNFERD J. WICKERHAM
S. PETER ROGOVIN

BY R. Hoffman.

ATTORNEY 3,021,323
Patented Feb. 13, 1962

3,021,323
PHOSPHOMANNAN NRRL Y-2448
Robert G. Benedict, Allene R. Jeanes, and Lynferd J. Wickerham, Peoria, and S. Peter Rogovin, Pekin, Ill., assignors to the United States of America as represented by the Secretary of Agriculture
Original application Feb. 3, 1959, Ser. No. 790,982. Divided and this application Apr. 5, 1960, Ser. No. 23,595
1 Claim. (Cl. 260—234)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention is directed to novel compositions of matter comprising a hitherto unknown phosphorylated mannan exhibiting unique and useful properties.

For convenience the phosphorylated polysaccharide of this invention will be designated as "phosphomannan."

Phosphomannan may be obtained in yields of about 35 or more percent by a whole culture aerobic fermentation of a medium comprising glucose, organic nitrogen sources, potassium dihydrogen phosphate, and trace elements for 96 hours at 23–30° C. (28° C. preferred) at pH 4.5–5.5 by the yeasts *Hansenula holstii* NRRL Y–2448, *Hansenula holstii* Y–2154, or *Hansenula holstii* Y–2155. When fermentation is complete the culture is smooth, homogenous, and fluid and exhibits a viscosity of about 800 centipoises, the latter term hereinafter abbreviated to "cps." Purification and isolation of the phosphomannan can be accomplished by supercentrifugation to remove the yeast cells, precipitation, reprecipitation, and partial dehydration by methanol in the presence of an electrolyte such as potassium chloride or sodium acetate, followed by washing in absolute methanol and oven-drying. The precipitated hydrous gum is of silvery appearance, semifirm, cohesive, tenaciously adhesive to dry surfaces, and can be pulled out into long ropes or fine threads. It readily redissolves in water forming tasteless solutions with a pH of about 7.0.

EXAMPLE 1

A substrate of the composition given below was cultured under aerobic conditions (0.5 millimole $O_2$/l./min.) for 96 hours at 28° C. with one-twentieth volume (5%) of a freshly prepared subculture of *Hansenula holstii* NRRL Y–2448.

| Component: | Weight by volume, percent |
|---|---|
| Commercial glucose | 6.0 |
| Corn steep liquor | 0.1 |
| Tryptone | 0.1 |
| $KH_2PO_4$ | 0.5 |
| Solution B (Speakman Salts)[1] v./v | 0.5 |
| Water | q.s. |
| (Initial pH 5.0) | |

[1] J. Biol. Chem. 58, 395 (1923–24).

Completion of the conversion at 96 hours, as shown by the substantially complete absence of glucose, was subjected to the following critical purification operations:

(1) The yeast cells are removed by supercentrifuging the culture after adding methanol and KCl to give concentrations of 24.7 percent and 2.25 percent respectively.

(2) Precipitation of impure phosphomannan from the supercentrifugate by the addition of sufficient methanol to comprise a 42–44 percent concentration of the methanol.

(3) Reprecipitations from 2–5 percent aqueous re-solutions of the phosphomannan by adding KCl and methanol to 1.5 percent and 45.5 percent respectively.

(4) Dehydration of a 4.5–6 percent aqueous or dilute methanolic re-solution of the last reprecipitate by pouring the re-solution into 7–9 parts of methanol containing 0.05 percent KCl.

(5) Washing with absolute methanol.

(6) Drying in vacuum oven at 25° C.

*Checimo-physical constitution of phosphomannan NRRL Y–2448*

Analysis of the isolated potassium salt of the polysaccharide shows that it contains 3.3 percent phosphorus, 4.2 percent monovalent cation calculated as K, and 12.6 percent ash. Hydrolysis followed by paper chromatography shows mannose as the only neutral sugar. These values agree with values calculated for a repeating unit containing one mono-potassium phosphate group for every five anhydrommanose units, the mono-potassium phosphate radicals being bound to the No. 6 carbon atom of every fifth anhydromannose unit. All the phosphate groups appear to be in diester form through cross-linking of chains.

Titration of an approximately 0.2 percent solution of the polysaccharide decationized by pressure-passage through a column of Dowex 50X4 resin gives an inflection point at pH 7 but no other with pH's tested up to pH 12. The determined neutral equivalent, 970, reasonably agrees with that expected for the postulated repeating unit carrying one titratable hydrogen.

A Somogyi determination of reducing power indicates a degree of polymerization of 850 or an average molecular weight of about 157,000, although ultracentrifugation studies indicate a molecular weight in the millions. The specific rotation in 0.01 molar potassium chloride solution is +102°.

As is characteristic of mannans, the phosphomannan forms a precipitate with alkaline copper sulfate under the conditions defined by Cifonelli, et al., J.A.C.S. 77, 5268 (1955).

When tested for homogeneity by graded additions of ethanol to an aqueous solution containing 1 percent potassium chloride by the method of Wilham, et al., Arch. Biochem. and Biophysics, 59, 61 (1955), 94 percent of the polysaccharide precipitated at ethanol concentrations of between 44.0 and 44.5 percent.

Structural analysis by the periodate oxidation method of Rankin, et al., J.A.C.S. 76, 4435 (1954) involving a 400-hour oxidation with sodium metaperiodate at 4° C., shows that the mannose units in the main chains are linked through 1–3 linkages and that the side chains which are terminated by a mannose unit carrying a phosphate group on $C_6$, and possibly only 1 unit long, are attached to the main chains by 1,2- or 1,4-linkages. Cross-linking of the primary chains through phosphate groups is shown by periodate-oxidation development of one equivalent of alkali-sensitive ester-type structure per phosphate group.

The presence of the phosphate group permits the formation of complexes with metals such as iron and copper as well as the formation of polysaccharide derivatives of organic alcohols, bases, and related substances, thus permitting the use of the macromolecule as a carrier for active metabolic or therapeutic substances in pharmaceuticals, nutritionals, biologicals, and soil or plant supplements. Phosphomannan NRRL Y–2448 is readily and completely water-soluble, forming clear viscous thixotropic solutions which would have utility in food processing, pharmaceutical, paper, and other industries as a thickening, stabilizing, dispersing, and suspending agent.

Viscosity characteristics

When the concentration of phosphomannan NRRL Y-2448 in water (FIG. 1) is plotted against viscosity, it is found that the viscosity rises to a maximum at a concentration of about 1.5 percent, decreases until a concentration of about 3.0 percent is reached, and then increases with an increasing concentration. The lowered viscosities with concentrations between 1.5 percent and 5 percent are believed to result from the mutual neutralization of the charges on neighboring polyions by the associated potassium ions.

Figure 2:
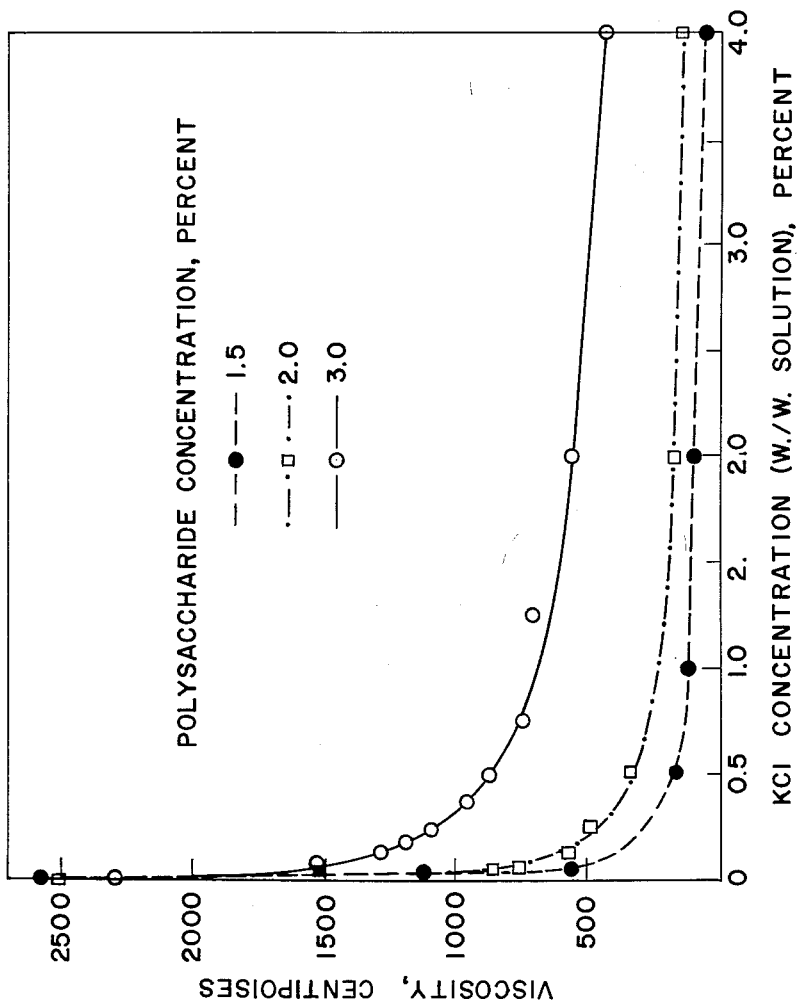

The data defining the curves of FIG. 2 show that the addition of potassium chloride markedly lowers the viscosity of an aqueous solution of the phosphomannan, e.g., the usual 2500 cps. viscosity of a 1.5 percent solution is lowered to about 150 cps. by 0.75 percent KCl.

Figure 3:
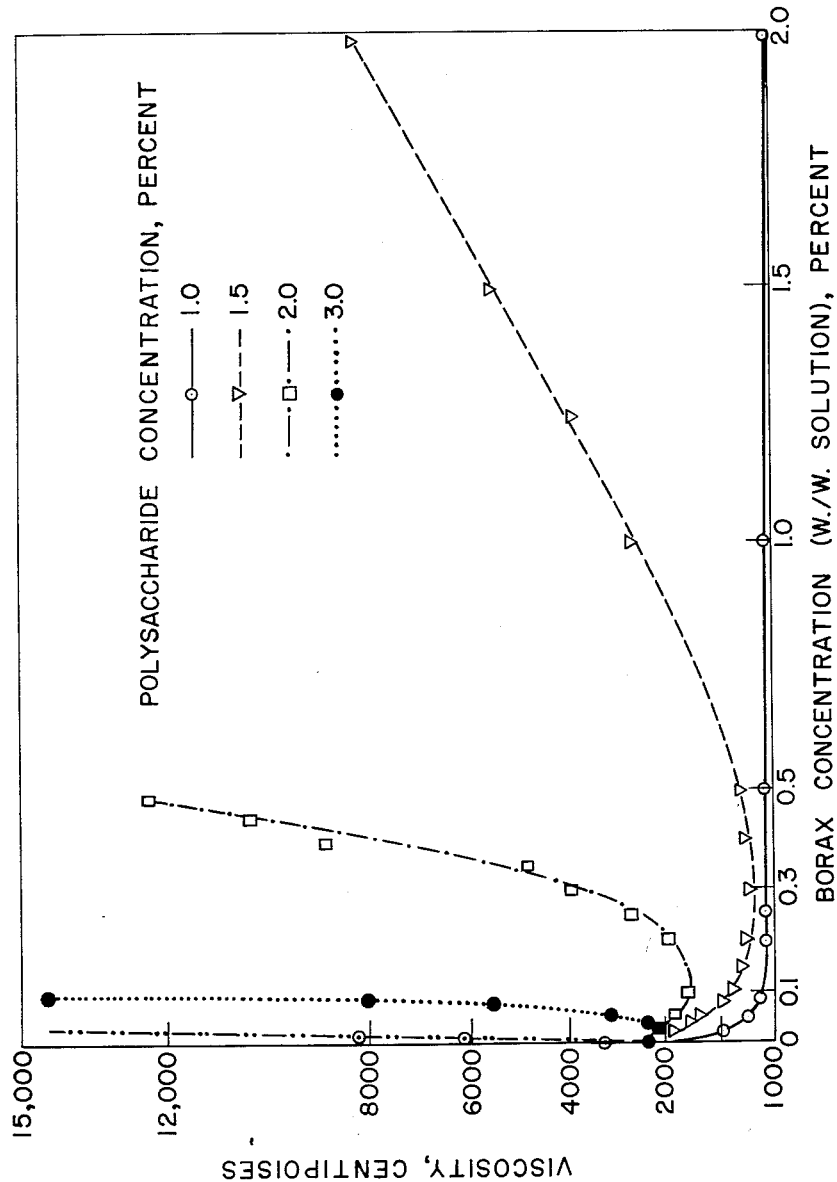

The data defined by the curves of FIG. 3 show that, in general, the addition of borax to aqueous solutions of the phosphomannan greatly increases the viscosity of the solution. For example, the 2500 cps. viscosity value of a 2 percent aqueous solution of the polysaccharide is increased 3.7 fold to a value of about 9000 cps. by the addition of 0.40 percent of borax to the solution. Borax also contributes a marked adhesiveness and ropiness to the thixotropic solutions, and the partially unsupported contents of a carefully tilted beaker may be withdrawn back into the container by restoring the latter to a normal position.

This application is a division of application S.N. 790,982 filed February 3, 1959, now Patent No. 2,961,378.

Having thus fully described our invention, we claim:

Phosphomannan NRRL Y-2448, said phosphomannan being a phosphorylated mannan polymer comprising about 850 anhydromannose units arranged in 1,3-linked main chains, an average every fourth anhydromannose unit of which is cross-linked through a fifth anhydromannose unit having on its number 6 carbon atom a monopotassium phosphate group which is further bound in di-ester linkage, said phosphomannan being further characterized by comprising about 3.3 percent phosphorus, by having a Somogyi-derived average molecular weight of about 157,000, a specific rotation in 0.01 M KCl of $+102°$, and by having atypical concentration-related viscosity response in aqueous solution, said viscosity response consisting of an increase to a maximum at a polymer concentration of about 1.5 percent followed by a decrease as the polymer concentration is further increased from the level of about 1.5 percent to the level of about 3 percent, and then an increase as the concentration of the polymer is further increased from about the level of 3 percent to a level of at least about 5 percent.

References Cited in the file of this patent

Pigman et al.: "Carbohydrate Chemistry" 1948, page 180.

Chemical Abstracts, vol. 49, column 14904i.

Chemical Abstracts, vol. 50, columns 7933i to 7934b.

Chemical Abstracts, vol. 48, column 11356a.